United States Patent
Ling et al.

(10) Patent No.: US 10,148,417 B2
(45) Date of Patent: Dec. 4, 2018

(54) DUTY-CYCLED HIGH SPEED CLOCK AND DATA RECOVERY WITH FORWARD ERROR CORRECTION ASSIST

(71) Applicant: Maxlinear, Inc., Carlsbad, CA (US)

(72) Inventors: Curtis Ling, Carlsbad, CA (US); Sheng Ye, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 120 days.

(21) Appl. No.: 15/185,429

(22) Filed: Jun. 17, 2016

(65) Prior Publication Data
US 2016/0373212 A1   Dec. 22, 2016

Related U.S. Application Data

(60) Provisional application No. 62/181,657, filed on Jun. 18, 2015.

(51) Int. Cl.
 *H03M 13/00* (2006.01)
 *H04L 7/00* (2006.01)
 *H04L 1/00* (2006.01)

(52) U.S. Cl.
 CPC .......... *H04L 7/0075* (2013.01); *H04L 1/0047* (2013.01)

(58) Field of Classification Search
 CPC ..................... H04L 7/0075; H04L 1/0047
 See application file for complete search history.

(56) References Cited

U.S. PATENT DOCUMENTS

| | | | | |
|---|---|---|---|---|
| 6,331,999 B1* | 12/2001 | Ducaroir | ................ | H03L 7/099 375/221 |
| 9,780,796 B2* | 10/2017 | Kou | ...................... | H03L 7/0807 |
| 2009/0196387 A1* | 8/2009 | McCune, Jr. | ......... | H04L 7/0338 375/355 |
| 2010/0328124 A1* | 12/2010 | O'Donnell | .......... | H03M 1/0836 341/143 |
| 2012/0300085 A1* | 11/2012 | Chen | ........................ | H04L 7/00 348/207.1 |
| 2013/0176155 A1* | 7/2013 | Aras | .................... | H04N 5/3577 341/122 |

* cited by examiner

*Primary Examiner* — Guy Lamarre
(74) *Attorney, Agent, or Firm* — McAndrews, Held & Malloy, Ltd.

(57) ABSTRACT

A method and system for duty-cycled high speed clock and data recovery with forward error correction are provided. The system operates on a first digital signal comprising a first plurality of samples and a second digital signal comprising a second plurality of samples. The second plurality of samples may be a subset of the first plurality of samples, for example, if the first and second pluralities of samples are generated by one analog-to-digital converter. A clock and data recovery module is operable to produce a timing indication according the second digital signal. The second plurality of samples is sampled intermittently. The discontinuity between bursts of samples in the second signal corresponds to a duty cycle. A forward error correction module is operable to produce a digital error-corrected signal according to the first digital signal and the timing indication.

20 Claims, 9 Drawing Sheets

DUTY-CYCLED HIGH SPEED CLOCK AND DATA RECOVERY WITH FORWARD ERROR CORRECTION ASSIST

CROSS REFERENCE TO RELATED APPLICATIONS

This application is a continuation of U.S. provisional patent application Ser. No. 62/181,657 filed Jun. 18, 2015, which is incorporated herein by reference as if fully set forth herein.

BACKGROUND

Limitations and disadvantages of conventional and traditional approaches to optical communications will become apparent to one of skill in the art, through comparison of such systems with some aspects of the present invention as set forth in the remainder of the present application with reference to the drawings.

BRIEF SUMMARY OF THE INVENTION

Systems and methods are provided for high speed clock and data recovery, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
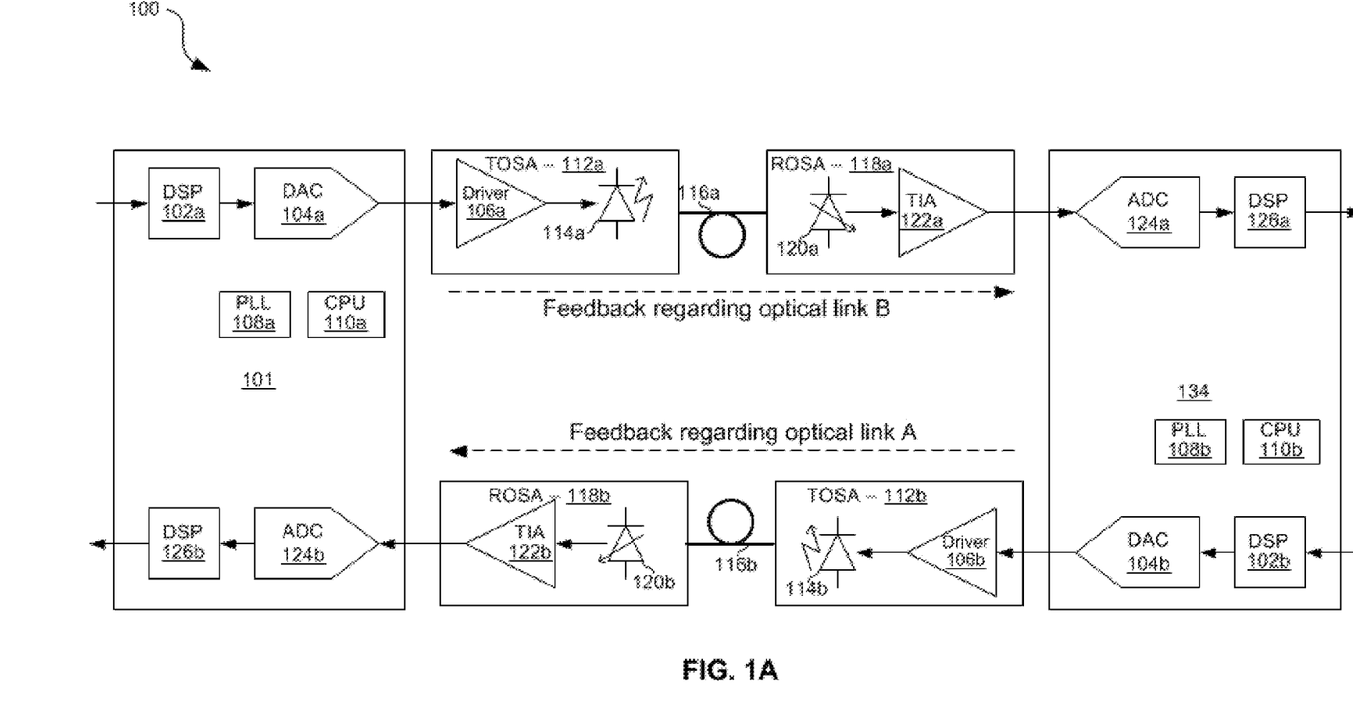
FIG. 1A shows a first example closed-loop optical communication system in accordance with aspects of this disclosure.

FIG. 1A shows a first example closed-loop optical communication system in accordance with aspects of this disclosure. The system 100 comprises an transmit and receive electrical subsystems 101 and 134, transmit optical subassemblies (TOSAs) 112a and 112b, receive optical subassemblies (ROSAs) 118a and 118b, and optical fibers 116a and 116b.

Each of the subsystems 101 and 134 comprises a transmit digital signal processing circuit 102, a receive digital signal processing circuit 126, a digital-to-analog converter (DAC) 104, an analog-to-digital converter (ADC) 124, a PLL 108, and a CPU 110 (where the different instances of each component are labeled 'a' and 'b', respectively). Each TOSA 112 comprises a laser diode driver 106, and a laser diode 114. Each ROSA 112 comprises a photodiode 114, and a transimpedance amplifier 122. The TOSA 112a, optical fiber 116a, and ROSA 118a are collectively referred to as "optical link A" and TOSA 112b, optical fiber 116b, and ROSA 118b are collectively referred to as "optical link B."

Each of the CPUs 110a and 110b is operable to manage operations of a respective one the electrical subsystems 101 and 134. Such management may comprise, for example, each of the CPUs 110a and 110b receiving feedback via a respective one of the optical links and configuring its DSP 102, DSP 126, DAC 104, and ADC 124 based on the received feedback. Each of the CPUs 110 may also generate feedback signals based on output of its respective DSP 126.

Each PLL 108 is operable to generate one or more timing signals such as sample clocks for the DAC 104 and ADC 124.

Each DSP 102 is operable to receive one or more streams of data and process the data to generate a signal suitable for directly modulating a respective one of the TOSs 112.

Each DAC 104 is operable to convert the digital signal output by a respective one of DSPs 102 to generate an analog waveform. Example configuration and operation of the DACs 104 is described below with reference to FIGS. 3C and 4.

Each driver 106 is operable to suitably condition the output of DAC 104a for application to a respective one of laser diodes 114.

Each laser diode 114 may comprise a semiconductor laser that is operable to generate a light beam having an intensity proportional to the current output by its respective driver 106 and at a wavelength that coincides with a minimum of dispersion in the optical fiber. The laser may be modulated with a data signal to be communicated via the optical fiber, where bandwidth limitations are reduced due to low dispersion and attenuation. The input current to output optical power of a typical laser diode may be highly nonlinear and vary greatly over temperature. Methods and systems for dealing with such nonlinearity and temperature dependence are further discussed below.

Each photodiode 120 is operable generate an output current proportional to the intensity of light incident on it.

Each transimpedance amplifier 122 is operable to convert the current output by a respective photodiode 120 to a voltage with a suitable range for input to a respective one of the ADCs 124.

Each ADC 124 is operable to convert the analog voltage present at its input to a corresponding digital value.

Each DSP 126 is operable to perform various operations on the received signal output by its respective ADC 124. Each DSP 126 may be operable to analyze a received signal to determine various characteristics of the optical link over which it was received. Such characteristics may include, for example: a nonlinearity of the optical link (e.g., coefficients of a Volterra series that models the link) and a temperature of the laser diode 114 of the optical link. The nonlinearity may be determined by, for example, comparing received signals (e.g., pilots or decoded data) with expected signals. The temperature may be indirectly determined based on known behavior of the optical components over temperature and/or determined directly from a temperature measurement reported by the optical components (e.g., on a control or "out-of-band" channel). Each DSP 126 may output the determined characteristics of its respective optical link to its respective CPU for generation of a feedback signal to communicate the determined characteristics back to the other electrical subsystem.

Figure 1B:
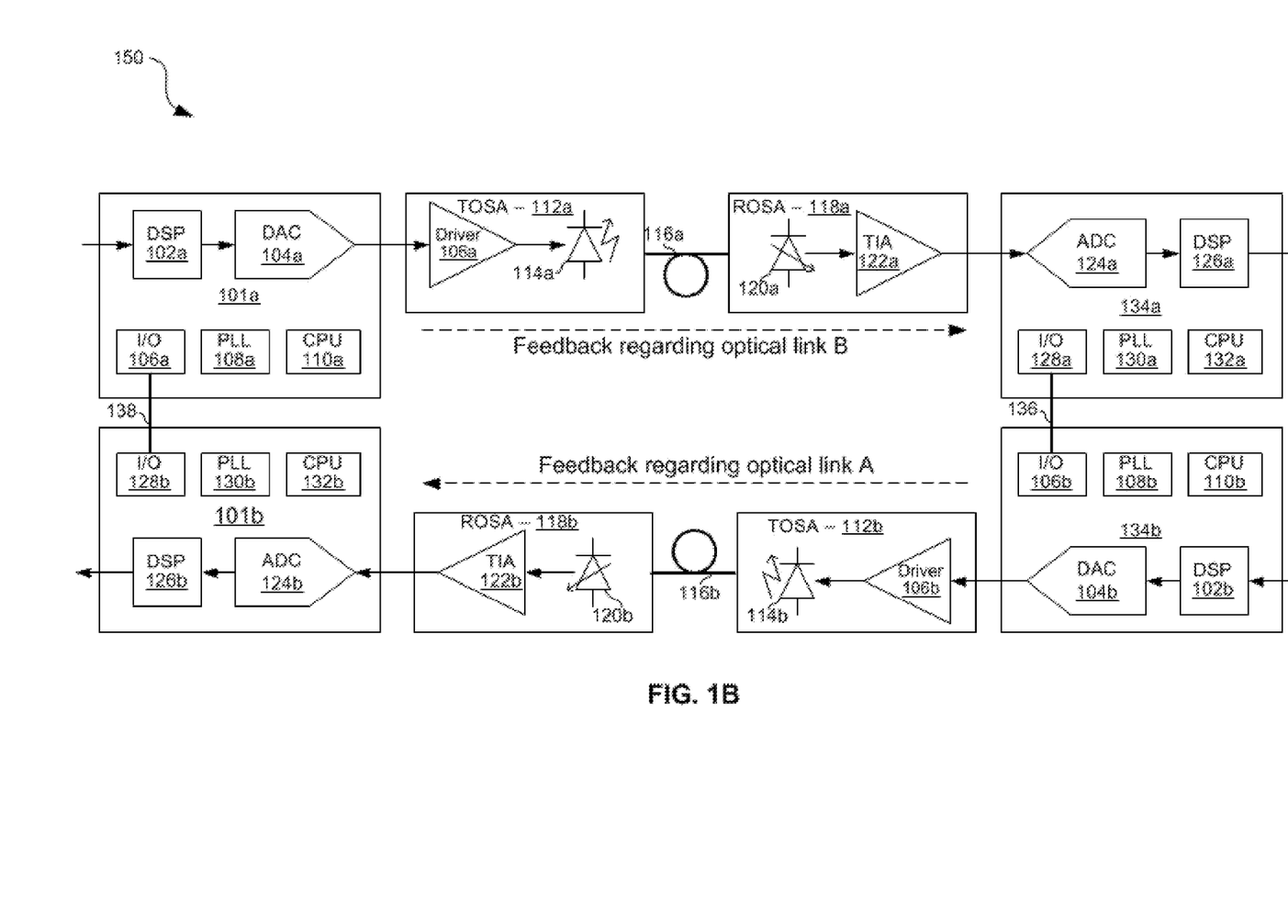
FIG. 1B shows a second example closed-loop optical communication system in accordance with aspects of this disclosure.

FIG. 1B shows a second example closed-loop optical communication system in accordance with aspects of this disclosure. The system 150 of FIG. 1B is similar to the system 100 of FIG. 1A except that electrical subsystem 101 is replaced by two discrete electrical subsystems 101a and 101b and electrical subsystem 134 is replaced by two discrete electrical subsystems 134a and 134b. In order to facilitate the feedback of the characteristics of the optical links, the electrical subsystems 101a and 101b comprise interface circuits 106a and 106b which are connected to each other via connection 138 and via which feedback about optical link A, received via optical link B, can be communicated to CPU 110a and used for configuring electrical subsystem 101a. Similarly, the electrical subsystems 134a and 134b comprise interface circuits 128a and 128b which are connected to each other via connection 136 and via which feedback about optical link B, received via optical link A, can be communicated to CPU 110b and used for configuring electrical subsystem 134b.

Figure 2:
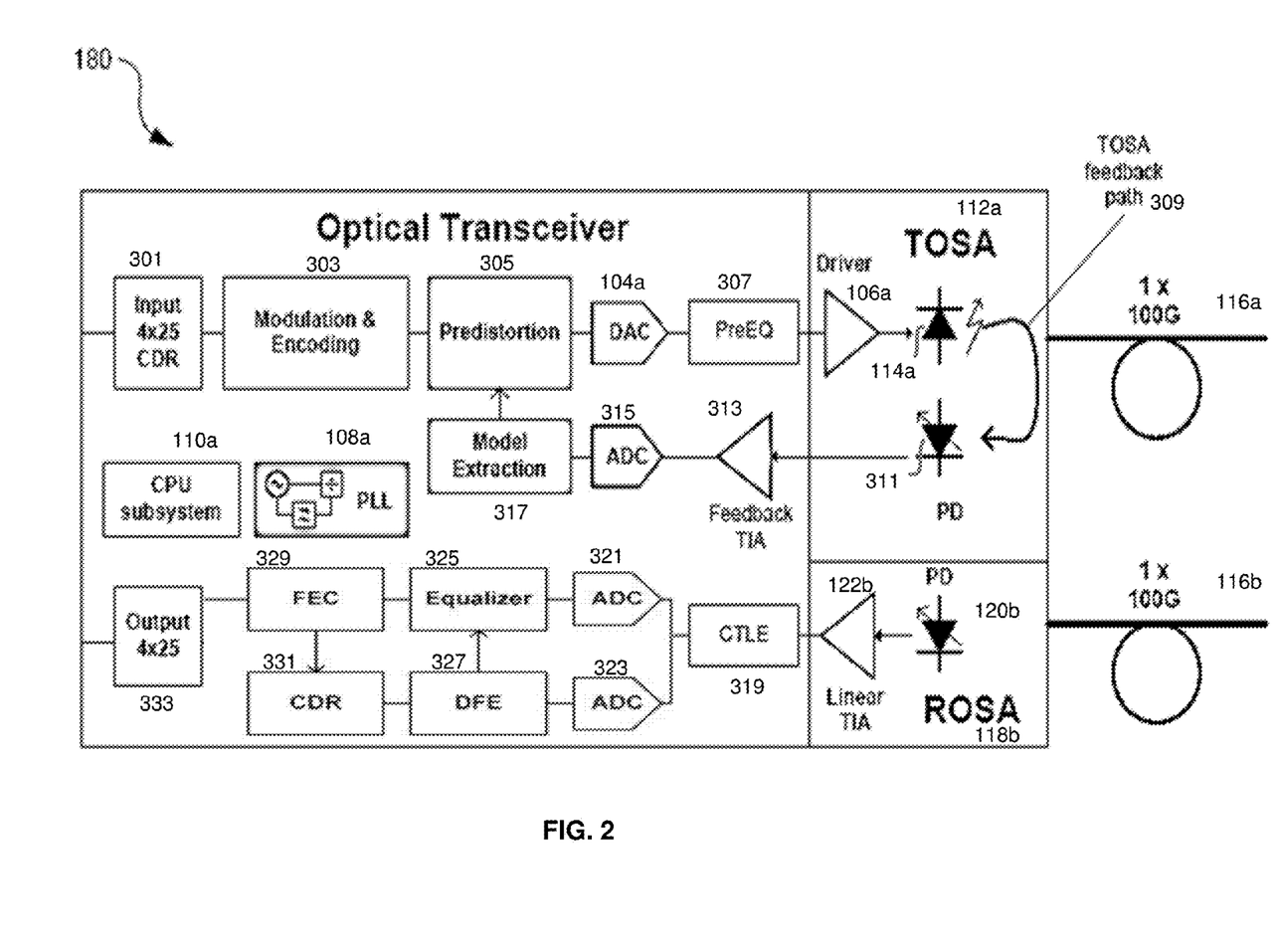
FIG. 2 shows another example optical communication system with high speed clock and data recovery, in accordance with aspects of the disclosure.

FIG. 2 shows another example optical communication system with high speed clock and data recovery, in accordance with aspects of the disclosure. As compared to the system 100 and 150, the system 180 comprises a feedback path 309 directly from the TOSA to the transceiver chip so that a feedback path/channel is not required from the opposite end of the optical fibers. The system 180 comprises a TOSA feedback path via a monitor photodiode that monitors the output of the TOSA laser and communicates an electrical signal back into the transceiver circuitry, which includes a feedback TIA 313, an ADC 315, a model extraction module 317, and a predistortion module 305. The transmit section of the optical transceiver circuitry may also include a clock data recovery module 301, a modulation and encoding module 303, and a pre-equalizer 307.

Clock and data recovery (CDR) is a critical function in high-speed transceivers. The data received in these systems are both asynchronous and noisy, requiring that a clock be extracted to allow synchronous operations. Furthermore, the data must be "retimed" such that the jitter accumulated during transmission is removed. At high speeds and high power, there may be many sources of jitter. High-order modulation increases that difficulty with a smaller eye opening, and more ISI due to more complex modulation. Jitter CDR circuits must satisfy stringent specifications defined by communication standards, posing difficult challenges.

In an example scenario, a duty-cycled CDR 331 with a forward error correction (FEC) 329 module may overcome these challenges. The receive side of the transceiver comprises a ROSA 118b with photodetector 120b and linear TIA 122b. The receive section of the optical transceiver circuitry may also comprise a continuous tile linear equalizer (CTLE) 319, two ADC's 321 and 323, an equalizer 325, a speculative digital front end (DFE) 327, and a receive output demultiplexer 333.

In a first receive path, ADC 321 provides a first signal comprising a first plurality of samples to an equalizer 325 and the equalized data are detected by the FEC module 329. In a second receive path, ADC 323 provides a second signal comprising a second plurality of samples to the duty-cycled CDR module 331. The second plurality of samples provided to the CDR module 331 may be sample bursts taken at a fraction of the data rate. In an example scenario, the burst sampling rate may be on the order of 50 GHz while the duty-cycled CDR rate may be on the order of 100 MHz, resulting in much lower power usage.

It should be noted that this duty-cycled clock and date recovery technique may be utilized with any high data rate signal, not just in optical transceivers. Many sources of jitter including deterministic jitter must be dealt with at high speeds. Increased modulation complexity further complicates matters. While symbols may be received at 56 G symbols/sec baud rate, the clock may be varying slowly, on the order of MHz, i.e. the clock may vary at a $10^6$-$10^7$ rate compared to the $10^{10}$ incoming data rate. Normally, information is extracted at each symbol, but this is extremely difficult at high speeds and high power. Rather than getting every single symbol for CDR, in an example embodiment, a burst of samples may be made, 6 for example, interleaved at twice the baud rate with slow repetition rate, e.g., 100 MHz.

The advantage with this technique is more time to perform convergence and to get better resolution of the samples during the bursts, improving the noise performance. This slow repetition rate results in less power being utilized due to the 100-500 times less speed. During this interval between sample bursts, more sophisticated algorithms and error correction can decode the signal to get reliable symbols preceding the current symbol, because inter-symbol interference is worse with high speed and higher complexity, and can be compensated with this sampling and processing.

This better resolution may open up the eye because of the high accuracy symbol determination/decoding between bursts. The FEC provides highly reliable symbols to the CDR for the 10 symbols before and after and has the actual voltages for the number of samples that are stored, a number that may be configured. In this way, the most likely value for a given phase offset may be determined with a great deal of reliability and accuracy, reducing deterministic jitter and benefiting from error correction. Thus, the system 180 enables coding gain, which is the measure in the difference between the signal-to-noise ratio (SNR) levels between an uncoded system and a coded system required to reach the same bit error rate (BER) levels when used with the error correcting code (ECC) in the CDRs, which cannot be done at normal high speeds.

While two ADCs 321 and 323 are shown in the receive path, a single ADC may be used with the output going to both the equalizer 325 and the DFE 327. Quantization noise may be reduced utilizing the duty-cycled FEC 329 and CDR 331 output, which may be coupled to the equalizer 325. The DFE 327 may update coefficients in the equalizer 325 after each sample burst as clocks have shifted, for example. The duty-cycled DFE 327 benefits from the additional processing time between sampling bursts, where higher resolution conversion is possible but not necessary. This may also result in better estimates of ISI for better jitter suppression.

Figure 3A:
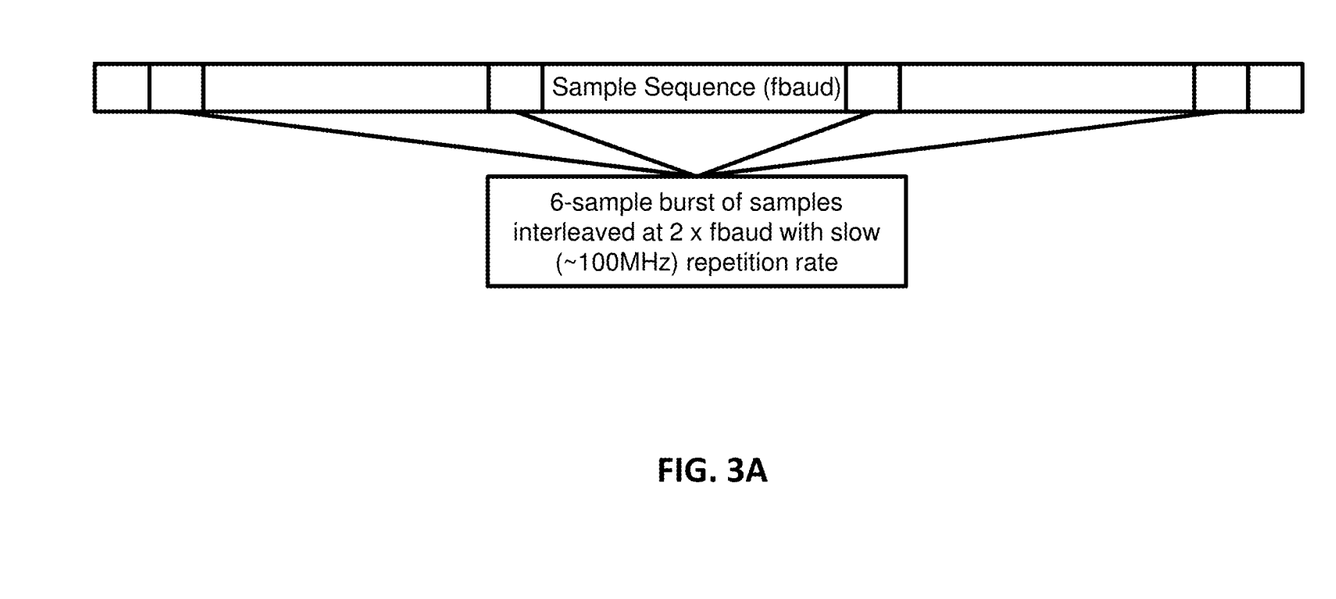
FIG. 3A illustrates a first example sample burst timing pattern, in accordance with an example embodiment of the disclosure.

FIG. 3A illustrates a first example sample burst timing pattern in accordance with an example embodiment of the disclosure. As shown in FIG. 3A, the second plurality of samples sent to the duty-cycled CDR module 331 are sampled intermittently. One or more samples may be converted as a burst at a high sample rate (e.g., at the baud rate or twice the baud rate). These sample bursts may be received at a slow repetition rate, on the order of 100 MHz, for example, compared to a 50 G samples/sec baud rate. Between sample bursts, the FEC may accurately determine symbols and the clock and data recovery may converge to compensate for clock offsets, with extracted information communicated to the equalizer to improve frequency response of the receive path.

Figure 3B:
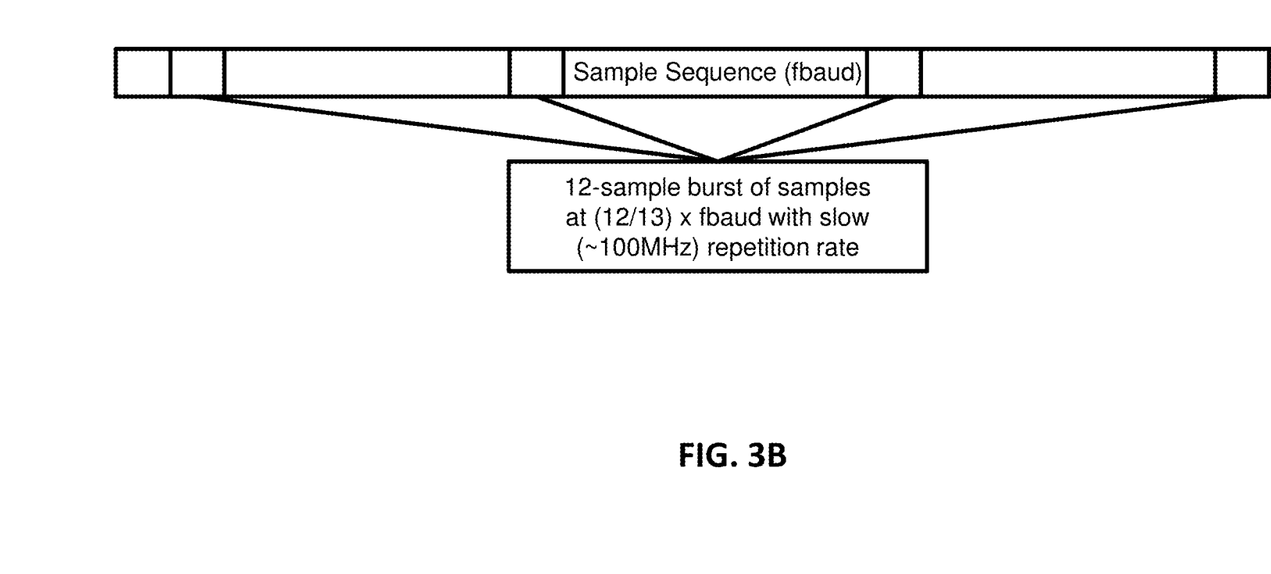
FIG. 3B illustrates a second example sample burst timing pattern, in accordance with an example embodiment of the disclosure.

FIG. 3B illustrates a second example sample burst timing pattern in accordance with an example embodiment of the disclosure. As in FIG. 3A, the CDR may sample bursts of samples in the data stream at a slow repetition rate, on the order of 100 MHz, for example, compared to a 50 G samples/sec baud rate. The clock in the second example, FIG. 3B, may be selected to receive samples at a fractional multiple of the baud rate (e.g., $(12/13) \times fbaud$). Therefore, consecutive samples within a burst may correspond to a collection of sample phases without requiring a sample rate that is faster than the baud rate. The CDR forms a histogram that coordinates the irregularly spaced samples for analysis.

Figure 3C:
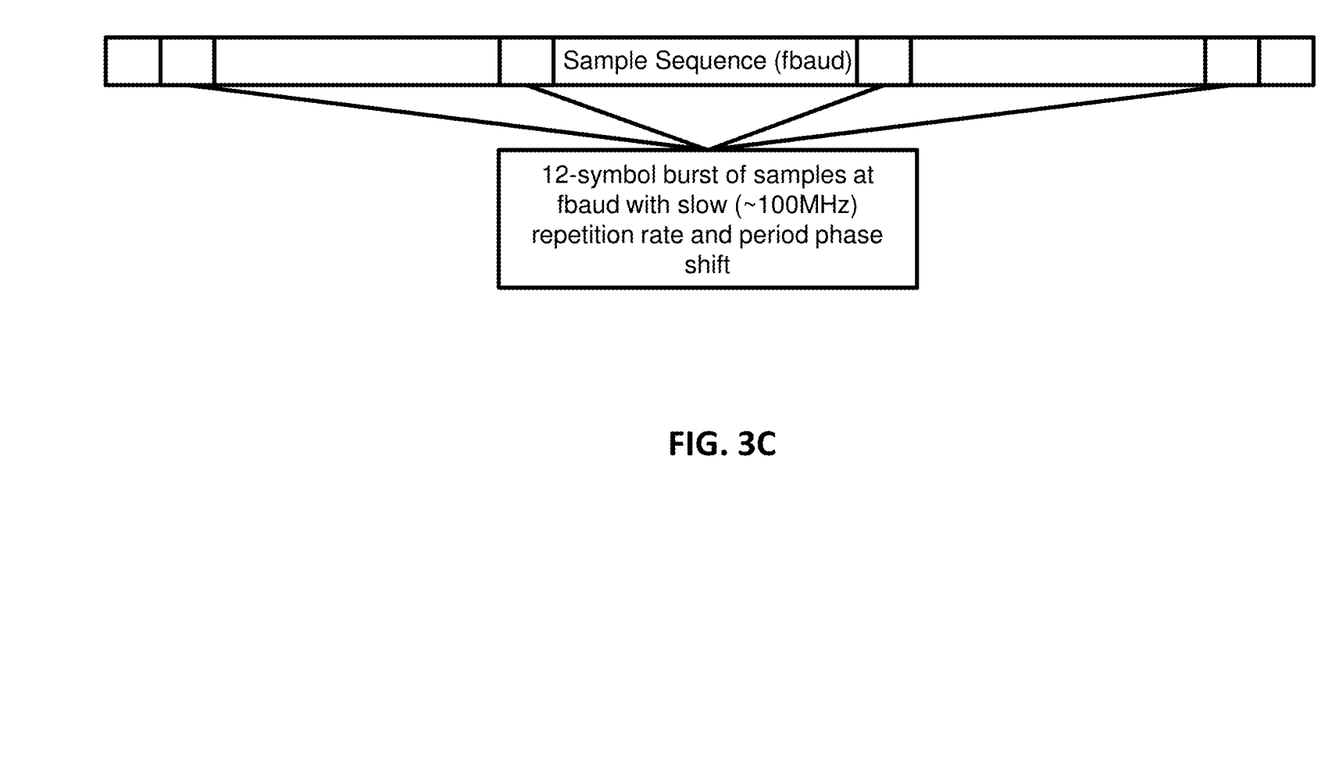
FIG. 3C illustrates a third example burst timing pattern, in accordance with an example embodiment of the disclosure.

FIG. 3C illustrates a third example sample burst timing pattern in accordance with an example embodiment of the disclosure. As in FIG. 3A and FIG. 3B, the CDR may sample bursts of samples in the data stream at a slow repetition rate, on the order of 100 MHz, for example, compared to a 50 G samples/sec baud rate. The clock in the third example, FIG. 3C, may be selected to receive samples at the baud rate (e.g., fbaud). Between sample bursts, the clock can be shifted in phase. Therefore, samples within a burst correspond to the same phase and consecutive sample bursts may correspond to a collection of sample phases without requiring a sample rate that is faster than the baud rate. The CDR forms a histogram that coordinates the irregularly spaced sample bursts for analysis.

Figure 4:
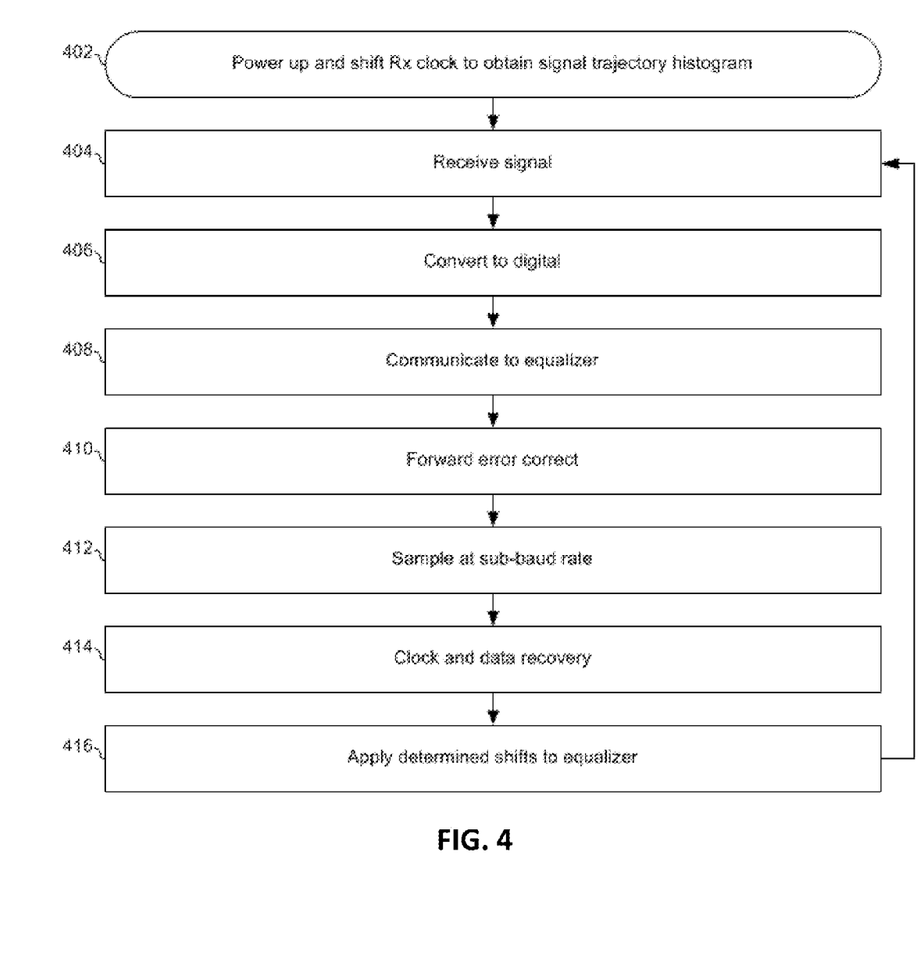
FIG. 4 is a flowchart illustrating operation of an optical communication system with duty cycled high speed clock and date recovery in accordance with aspects of this disclosure.

FIG. 4 is a flowchart illustrating operation of an optical communication system with duty cycled high speed clock and data recovery in accordance with aspects of this disclosure. In block 402, the transceiver may be powered up and a receive clock phase may be shifted relative to the transmit clock to obtain a signal trajectory histogram. In block 404, a signal may be received, such as an electrical signal generated from a received optical signal, for example.

In block 406, the electrical signal may be converted to a digital signal by two ADCs. In block 408, the output of one of the ADCs may be communicated to an equalizer followed by block 410 where forward error correction may be utilized to decode the desired data signal.

In block 412, the digital signal may be sampled in bursts at a repeat rate that is approximately 100-500 times slower than the data baud rate. In block 414 a clock and data recovery module may receive highly reliable symbols from the FEC for the 10 symbols before and after and has the actual voltages for a predetermined number of samples that are stored. In this way, the most likely value for a given phase offset may be determined with a great deal of reliability and accuracy, reducing deterministic jitter and benefiting from error correction.

In block 416, the determined clock shifts may be compensated for and/or may be utilized to configure the equalizer utilizing the DFE. The process may continue with further signals received and processed starting in block 404.

Figure 5:
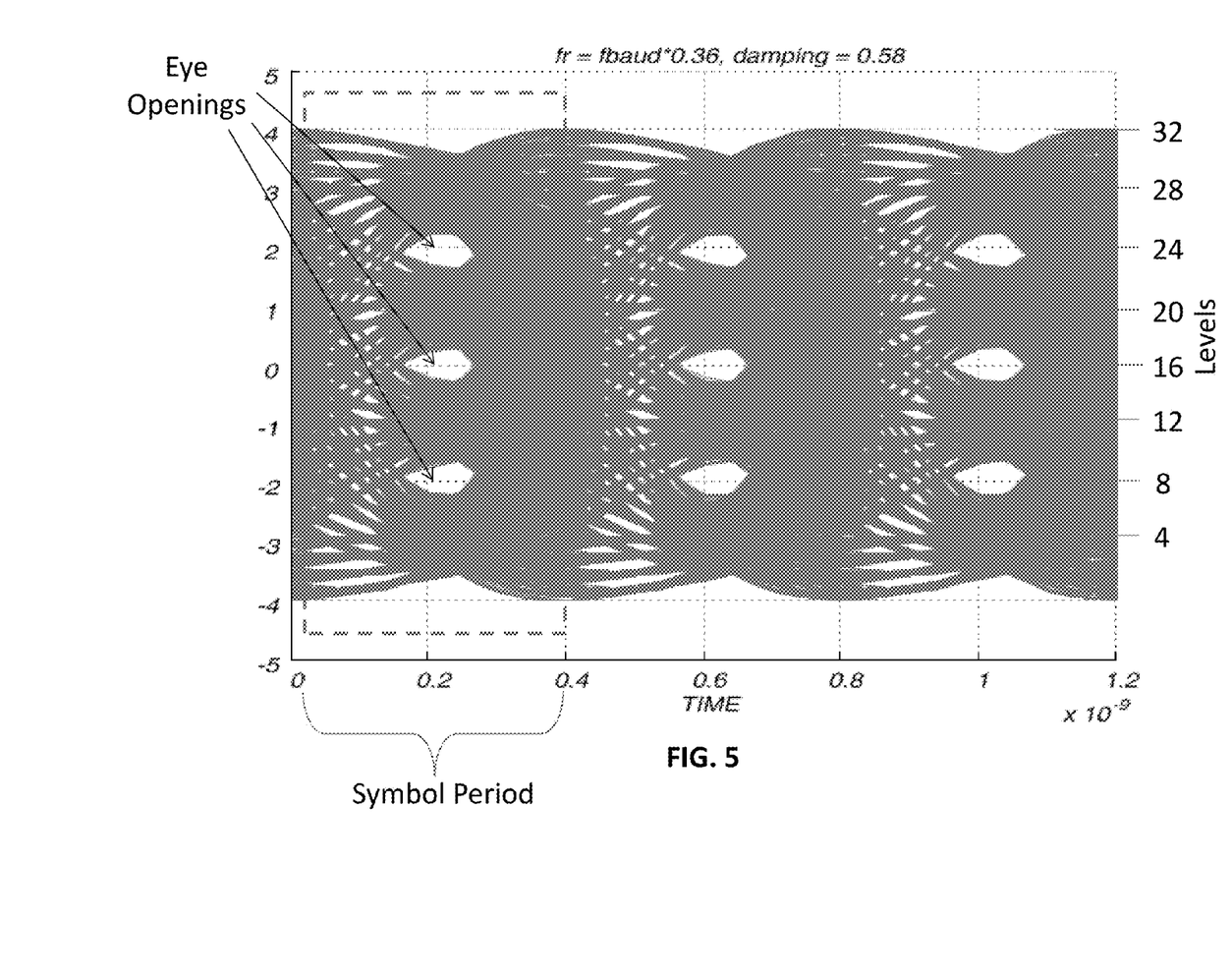
FIG. 5 illustrates an eye pattern in accordance with an example embodiment of the disclosure.

FIG. 5 illustrates an eye pattern of signal trajectories for 4-level pulse amplitude modulation in accordance with an example embodiment of the disclosure. As speeds increase and the number of bit levels increases, the eye pattern becomes more closed. The eye openings indicate a low probability of a particular level at a point in time during the sample period. A closed eye pattern indicates a higher likelihood of error.

Figure 6:
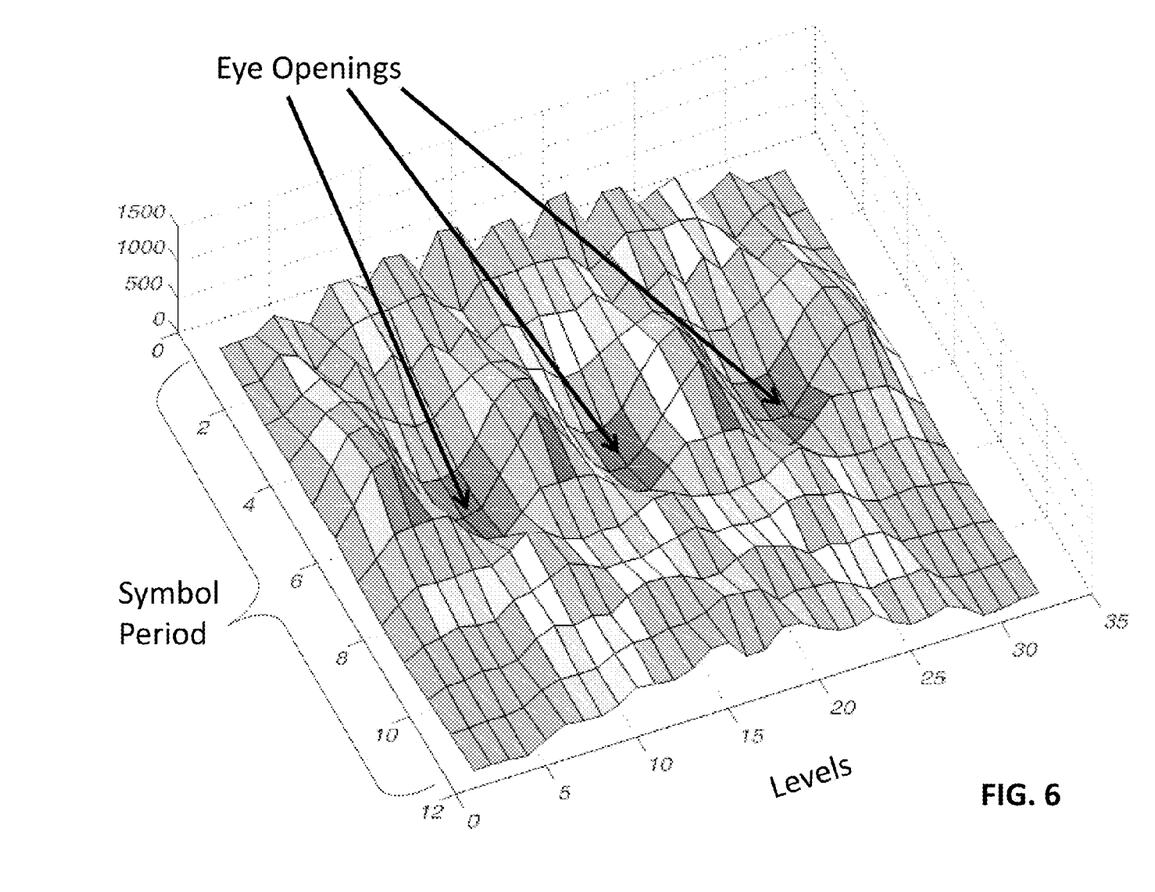
FIG. 6 illustrates a histogram of signal trajectories in accordance with an example embodiment of the disclosure.

FIG. 6 illustrates a histogram of signal trajectories in accordance with an example embodiment of the disclosure. The histogram illustrates a symbol period quantized into 12 time bins. The values of the signal are quantized into 5 bits (i.e., 32 levels). The vertical axis indicates the collected statistics on the occurrences of a given level during each time bin. A different number of levels may be selected according to the modulation scheme. A different number of time bins may be used for a finer resolution. The time bins may also be adaptively controlled, such that a coarse resolution across the entire symbol period is adapted to span a subsection of the symbol period with a finer time resolution as statistics are gathered.

During power-up of the system and/or during initial acquisition, the phase of a receive clock may be adjusted relative to a transmit clock, and in an example scenario, one or both clocks may be slid to deliberately add offset, i.e., adjusting the phase of the sample time, such that the optimum in the histogram may be determined. Appropriate time slicing based on the histogram peaks can be used subsequently to adjust the equalizer 325 and CTLE 319 as illustrated in FIG. 2. The equalizer also benefiting from processing and error correction.

As illustrated in FIG. 6, relative minima and maxima occur along the line of the $6^{th}$ time bin. Sample timing may be optimized by adjusting the phase of a receive clock to coincide with the peak levels in the $6^{th}$ time bin, for example. The relative minima correspond to the eye openings in FIG. 5.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

The present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A receiver for data communications, comprising:
   a forward error correction circuit operable to produce a digital error-corrected signal according to a first digital signal and a timing indication, the first digital signal comprising a first plurality of samples, the first plurality of samples being sampled continuously by a first clock having a first sample rate and a first phase; and
   a clock and data recovery circuit operable to increase an accuracy of the timing indication according a second digital signal, wherein:
      the second digital signal comprises a second plurality of samples,
      the second plurality of samples comprises bursts of two or more samples spanning a first length of time,
      the two or more samples in a burst are sampled by a second clock having a second sample rate and a second phase, and
      a ratio between a burst length and a discontinuity between consecutive bursts of two or more samples corresponds to a duty cycle of a third clock that is slower than the second sample rate.

2. The receiver of claim 1, wherein the second plurality of samples is a subset of the first plurality of samples.

3. The receiver of claim 1, wherein the second plurality of samples is produced by a high-speed, high-bandwidth photodiode that intermittently monitors an optical signal.

4. The receiver of claim 1, wherein the forward error correction module is operably connected to a continuous time linear equalizer.

5. The receiver of claim 1, wherein the first sample rate is equal to a symbol rate of received data.

6. The receiver of claim 1, wherein the second sample rate is equal to twice a symbol rate of received data.

7. The receiver of claim 1, wherein the duty cycle is one percent or less.

8. The receiver of claim 1, wherein the second clock is out of phase with the first clock.

9. A method for receiving data, comprising:
   continuously sampling an analog signal at a first sample rate, using a clock and data recovery circuit, to produce a first plurality of samples;
   sampling the analog signal in bursts of two or more samples, using the clock and data recovery circuit, to produce a second plurality of samples, wherein samples within a burst are at a second sample rate, and wherein a ratio between a burst length and a discontinuity between consecutive bursts corresponds to a duty cycle of a clock that is slower than the second sample rate;
   recovering a timing indication, with increased accuracy, according to the second plurality of samples; and
   producing, using a forward error correction circuit, a digital error-corrected signal according to the first plurality of samples and the timing indication.

10. The method of claim 9, wherein the second plurality of samples is a subset of the first plurality of samples.

11. The method of claim 9, wherein the second plurality of samples is produced by a high-speed, high-bandwidth photodiode that intermittently monitors an optical signal.

12. The method of claim 9, wherein the method comprises equalizing the first plurality of samples.

13. The method of claim 9, wherein the first sample rate is equal to a symbol rate of received data.

14. The method of claim 9, wherein the second sample rate is equal to twice a symbol rate of received data.

15. The method of claim 9, wherein the duty cycle is one percent or less.

16. The method of claim 9, wherein the second sample rate is out of phase with the first sample rate.

17. A machine-readable storage having stored thereon, a computer program having at least one code section for enabling data reception, the at least one code section being executable by a machine for causing the machine to perform operations comprising:
   continuously sampling an analog signal at a first sample rate, using a clock and data recovery circuit, to produce a first plurality of samples;
   sampling the analog signal in bursts of two or more samples, using the clock and data recovery circuit, to produce a second plurality of samples, wherein samples within a burst are at a second sample rate, and wherein a ratio between a burst length and a discontinuity between consecutive bursts corresponds to a duty cycle of a clock that is slower than the second sample rate;
   recovering a timing indication, with increased accuracy, according to the second plurality of samples; and
   producing, using a forward error correction circuit, a digital error-corrected signal according to the first plurality of samples and the timing indication.

18. The machine-readable storage of claim 17, wherein the second plurality of samples is a subset of the first plurality of samples.

19. The machine-readable storage of claim 17, wherein the duty cycle is one percent or less.

20. The machine-readable storage of claim 17, wherein the second sample rate is out of phase with the first sample rate.

* * * * *